June 3, 1930.  B. OBER  1,761,991
METHOD FOR MANUFACTURING ACID PHOSPHATE
Filed June 5, 1925  5 Sheets-Sheet 1
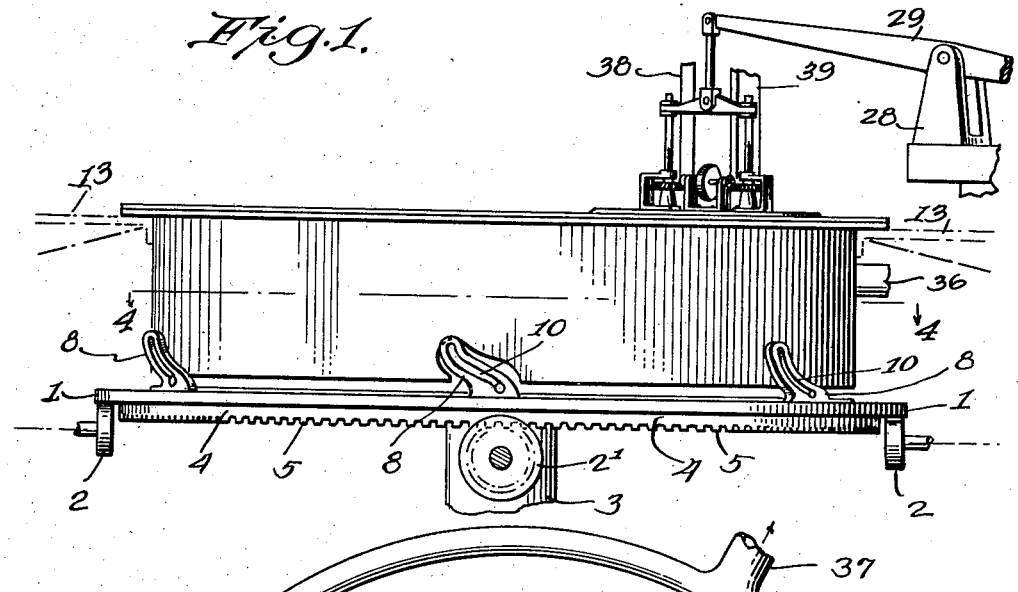
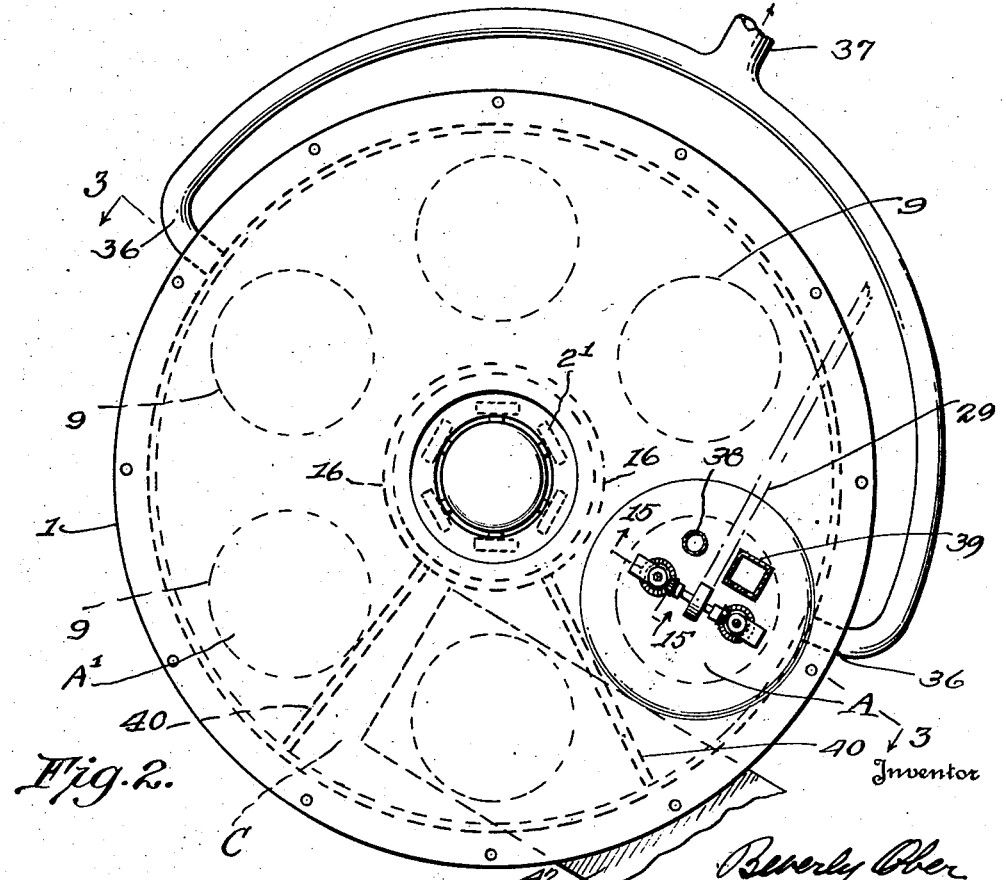

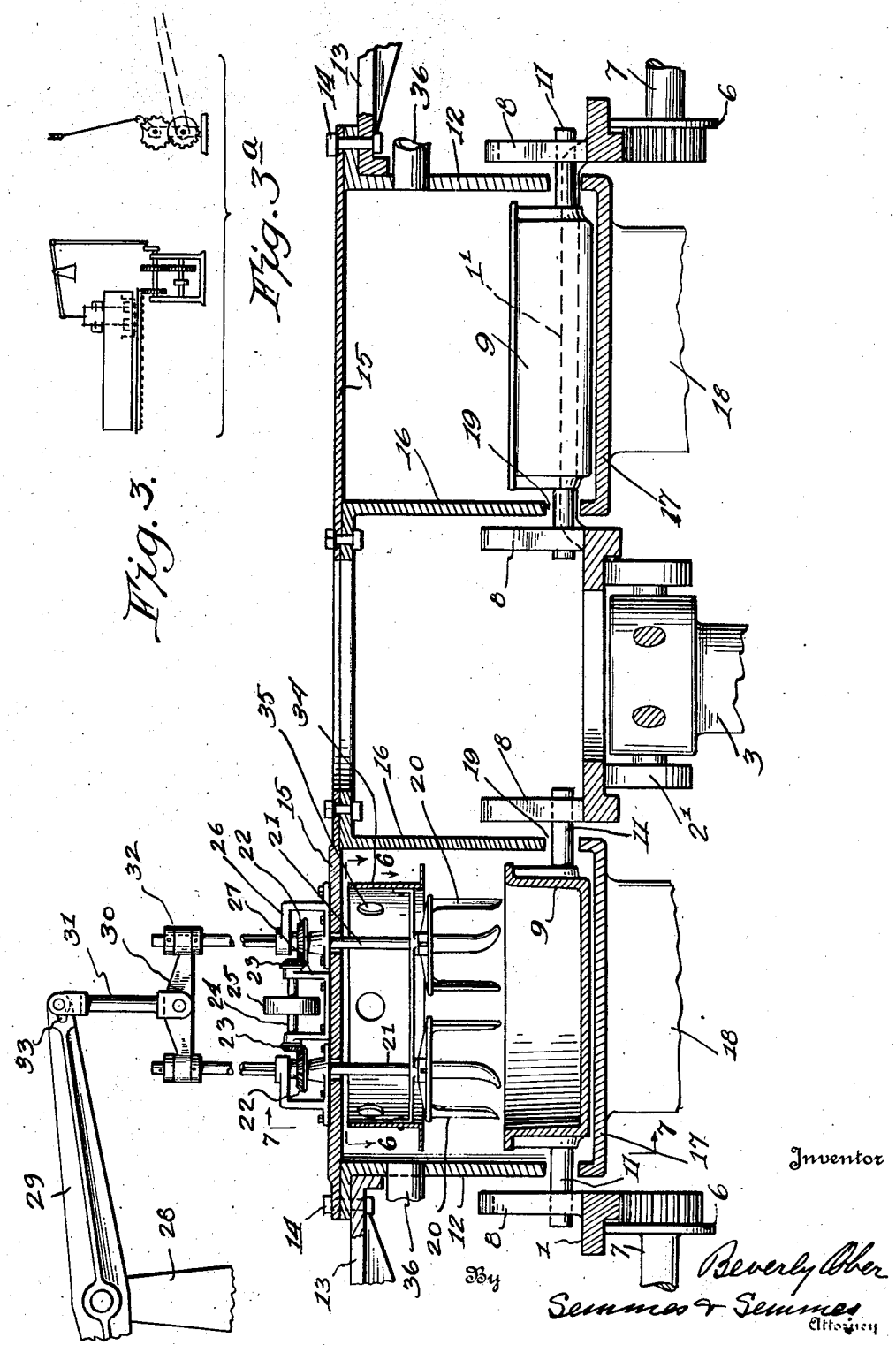

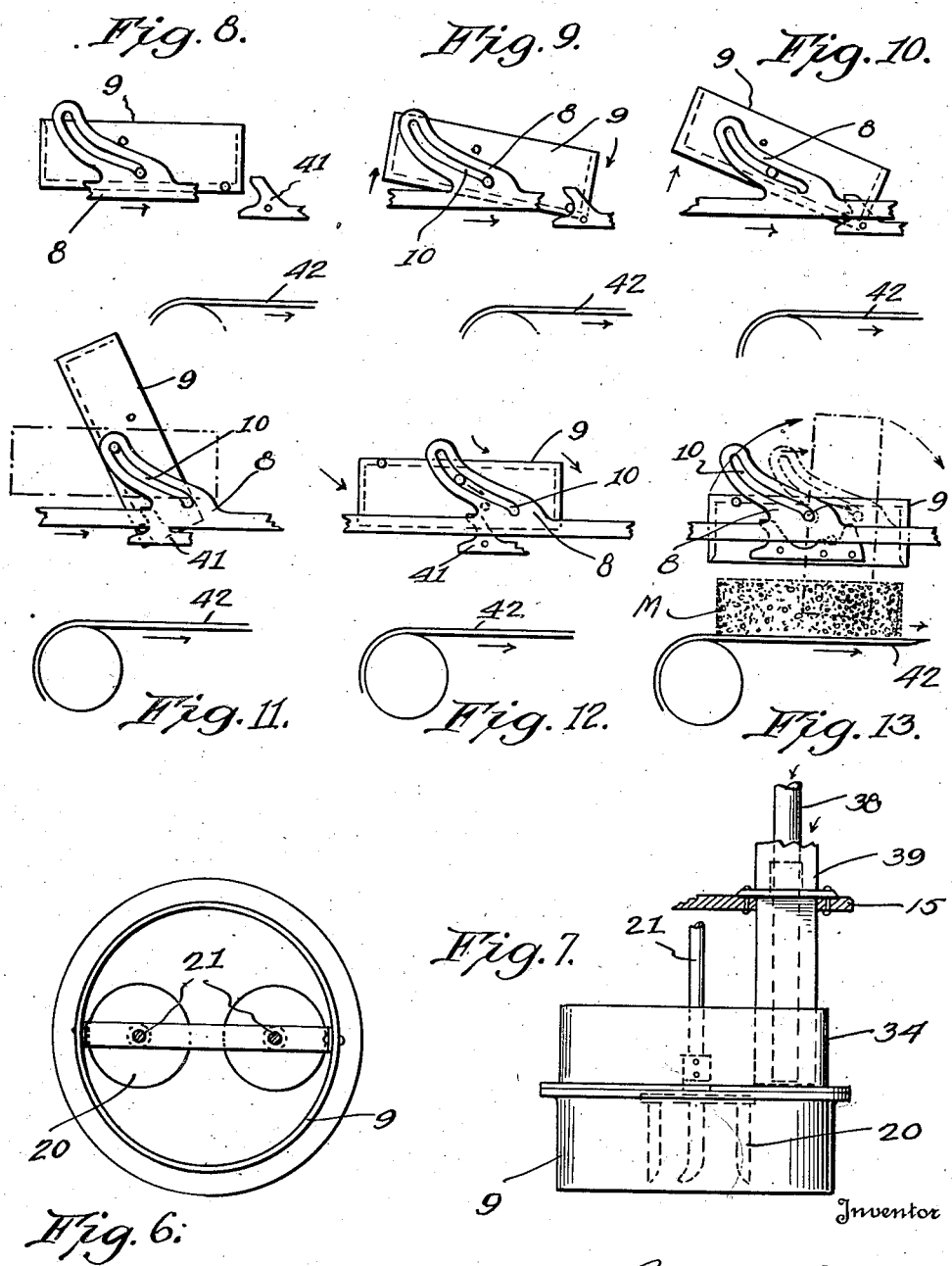

June 3, 1930. B. OBER 1,761,991
METHOD FOR MANUFACTURING ACID PHOSPHATE
Filed June 5, 1925 5 Sheets-Sheet 5
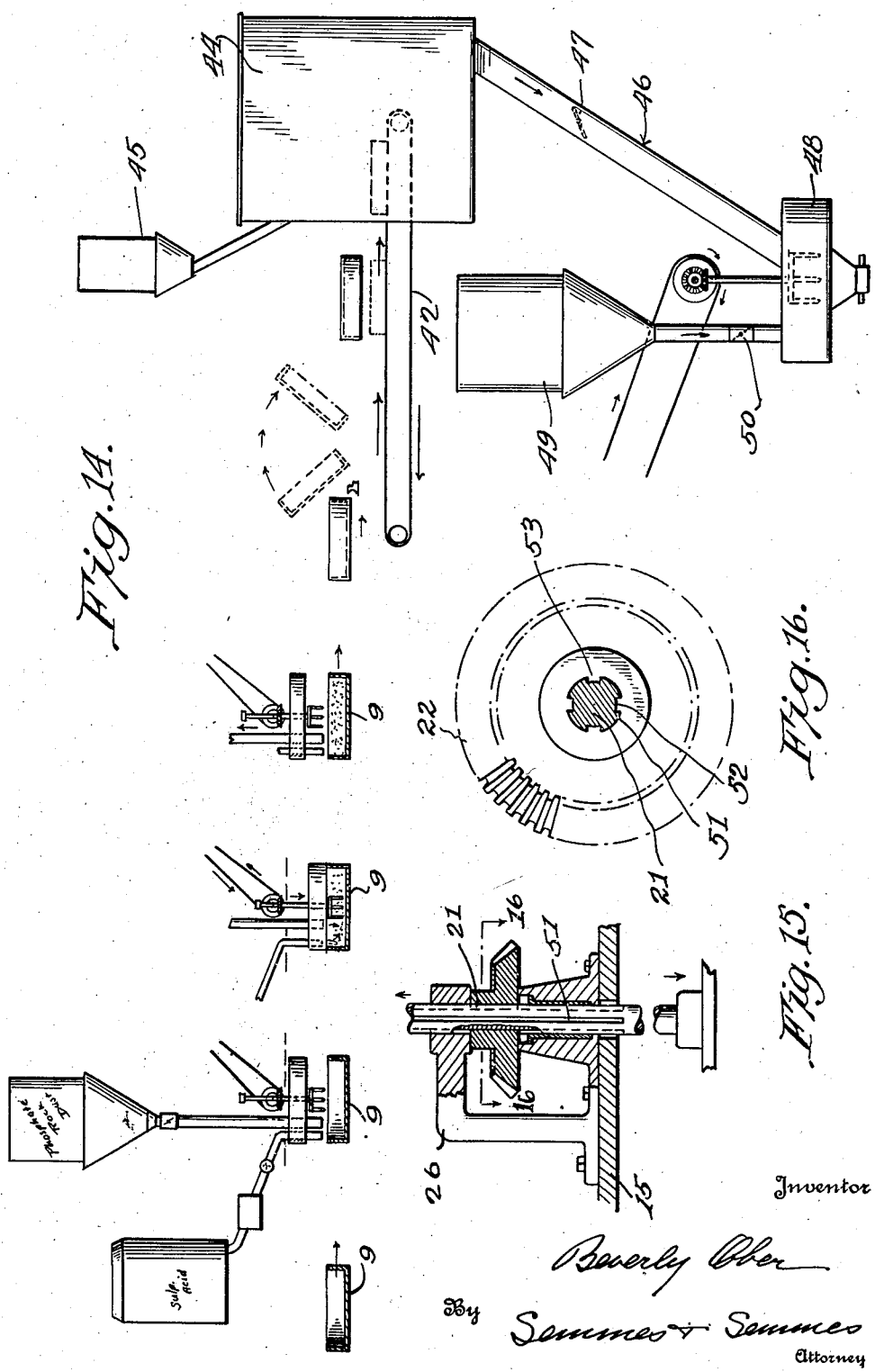
Inventor
Beverly Ober
By Semmes + Semmes
Attorney Patented June 3, 1930

1,761,991

UNITED STATES PATENT OFFICE

BEVERLY OBER, OF BALTIMORE, MARYLAND, ASSIGNOR TO G. OBER & SONS COMPANY, OF BALTIMORE, MARYLAND

METHOD FOR MANUFACTURING ACID PHOSPHATE

Application filed June 5, 1925. Serial No. 35,110.

My invention relates to a process of treating acid phosphate or super phosphate.

Phosphate rock contains tri-basic phosphate of lime which is insoluble in water, and in order to obtain soluble phosphoric acid, many processes have been proposed. One of the common methods of manufacturing acid phosphate or superphosphate from phosphate rock is to grind the phosphate rock and treat it with sulphuric acid. The ground rock and acid are discharged into a den, and remain therein for a certain period of time to permit further chemical action. The mixture then becomes a spongy mass which is broken down by some means and removed to a curing chamber shed where additional chemical action takes place.

The methods heretofore employed for manufacturing acid phosphate have many disadvantages. In nearly all of the processes the charges of phosphate rock and acid, after changing to a solid form, are delivered to a disintegrating machine which breaks down the charges.

The effect of using a disintegrator is to seal the pores of the semi-solid mass, which impedes the action of crystallization. In my process, the charges after being mixed are handled in such a manner as to maintain the porosity of the mass substantially the same as when the charge is mixed.

Sometimes the charges of phosphate rock and acid are transferred to a den into which they are dumped one upon another. The result of this treatment is to seal the pores of the spongy mass, thus hindering the action of crystallization.

My process contemplates the handling of the charges individually and with the least possible change in the porosity of the mass of a charge.

In the accompanying drawings I have shown an apparatus for putting into practice my improved process. The arrangement, to be hereinafter described, consists essentially of a revolving frame having a series of containers mounted thereon for the reception of a mixture or batch of ground phosphate rock and acid, means for suitably mixing a batch, means to discharge the batch from a container at a predetermined time after mixing, and means to convey the batch to a drying room without disturbing the porosity due to the chemical action of the ingredients mixed.

When phosphate rock and an acid are mixed together they first form a liquid or semi-liquid mass which gives off several gases of fluorine, carbon, etc. As the semi-liquid mass solidifies, it does so in a porous mass due to the escaping gases. This porosity can be increased in several ways; by the addition of lime to phosphate rock before mixing, or by heating the acid to fairly high degrees of heat.

The time required for the setting up of this semi-liquid mass varies with several factors, among which are the quality of the phosphate rock used, the fineness to which the rock is ground before mixing, and the amount and strength of the acid. All of these factors are so well known and controlled that the mass can be said to solidify sufficiently for handling in approximately fifteen minutes.

This porous mass is not yet complete in its chemical reactions. The actions of crystallization must be completed, also the free phosphoric acid which is always present must be reduced to a minimum to be best handled industrially and commercially.

An object of my invention is to provide a method of manufacturing acid phosphate whereby a batch of ground phosphate rock and an acid is thoroughly mixed to form a porous mass and the drying effected without substantially disturbing the porosity of the mass.

Another object of my invention is to increase the available phosphoric acid obtained from a mixture of phosphate rock and acid by combining a quantity of ground phosphate rock with the mixture after it has been agitated.

Still another object of my invention is to treat the mixture of ground phosphate rock and acid so that it is prepared for commercial use with the least possible handling.

With these and other objects in view, which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a general elevational view of the chamber for housing a battery of acid phosphate mixing pans or molds;

Fig. 2 is a plan view of the chamber;

Fig. 3 is a vertical sectional view along line 3—3 of Fig. 2;

Figure 4:
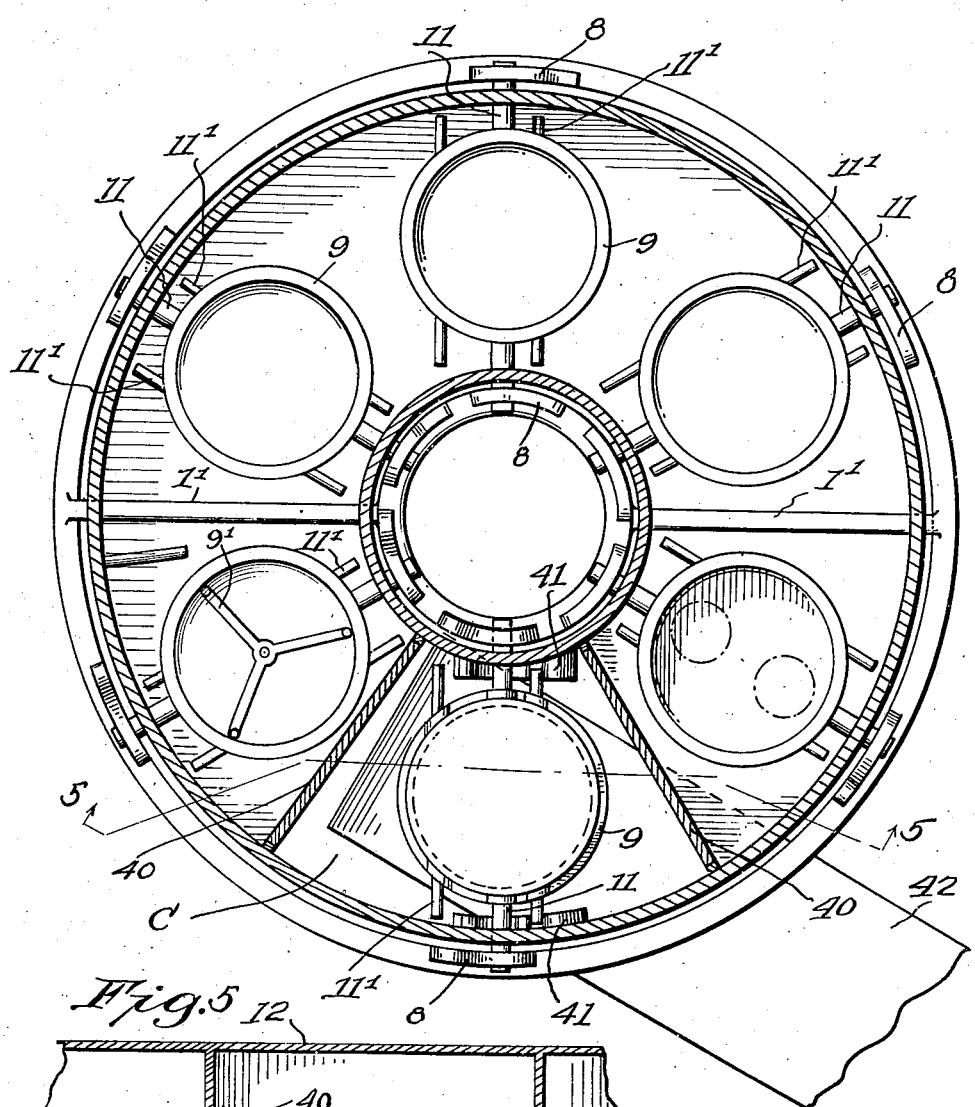
Figure 5:
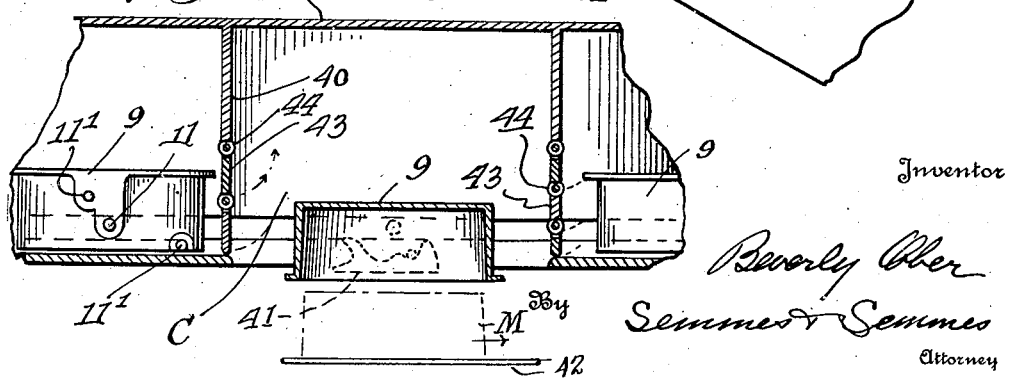

Fig. 3ª is a diagrammatical view of the transmission;

Fig. 4 is a sectional view along line 4—4 of Fig. 1;

Fig. 5 is a sectional view along line 5—5 of Fig. 4;

Fig. 6 is a sectional view of the mixer, taken along line 6—6 of Fig. 3, looking in the direction of the arrows;

Fig. 7 is a detail view of acid and dust inlets along line 7—7 of Fig. 3;

Figs. 8 to 13 inclusive show diagrammatic views of the tripping mechanism used to trip the molds;

Fig. 14 is a diagrammatic view showing the steps of my process;

Fig. 15 is a sectional view along line 15—15 of Fig. 2;

Fig. 16 is a sectional view along line 16—16 of Fig. 15.

Referring to the drawings, and more particularly to Figs. 1, 2 and 3, the apparatus consists of a circular frame 1 supported by means of a plurality of rollers 2 and a central support member 3, to which are attached a group of rollers 2'. The frame 1 is provided with an annular shoulder projection 4 having teeth 5 cut therein, adapted to mesh with gear wheels 6 attached to shafts 7. The shafts are rotated by means of a motor or other source of power and cause the frame to be revolved.

Mounted upon the frame are a series of guide supports 8 which support a plurality of containers or molds 9 adapted to receive a mixture of ground phosphate rock and a suitable acid. The guides 8 are provided with curvilinear slots 10 which receive rod extensions 11 attached to the containers. The function of the curved slots in the guide members will be hereinafter described in connection with the trip operating device which is used to discharge the containers.

The containers 9 are substantially cylindrical in form, and it will be noted that the inside diameter of the base of the container is slightly less than the diameter of the top. This gives a slope to the inner surface so as to facilitate the discharge of material from the containers when they are inverted. In addition to the rod extensions 11, the containers are provided with rod members 11' which cooperate with suitable trip members when the containers are discharged.

Fitting down over the containers and acting as a closure therefor, is a stationary housing 12. The housing is cylindrical in form and is attached to suitable support members 13 by a bolt means 14. The housing is provided with a cover 15 having a concentric cylindrical member 16 attached thereto. The cylindrical member forms with the housing an annular compartment in which are placed the containers. A base 17, supported by the members 18, is provided for the housing, and between the base and upper portion of the housing are openings 19 to permit the passage of the rod extensions 11 attached to the containers.

Mounted upon the cover 15 is a suitable agitating mechanism for stirring or mixing a batch of material in one of the containers. This stirring mechanism comprises a plurality of blades 20 mounted upon shafts 21 which carry gear wheels 22 adapted to mesh with gears 23 attached to a shaft 24. Carried on the shaft 24 is a pulley 25. This pulley, when rotated by means of a suitable source of power, causes the blades, through the gear mechanism and the shafts, to revolve and thoroughly mix the materials in the containers. The gear mechanism and the shafts of the agitating device are mounted upon the cover 15 by suitable support brackets 26 and 27.

The shafts 21 are adapted to be raised and lowered in the containers 9 by a fulcrum means comprising a support 28 and an arm 29. The arm is attached to a cross bar 30 through a connecting rod member 31. The shafts are connected with the cross member by means of passing the shafts through the bar and affixing suitable fastening means 32 to the shafts. It will be noticed that the arm 29 is provided with a slot 33 where the connection to the rod 31 engages the arm. The purpose of this slot is to permit free movement of the arms of the raising device when the blades are lifted from the operative position.

Mounted upon the shafts above the blades 20 is a cylindrical casing 34 having openings 35 therein. The purpose of this casing is to provide a cover member for a container. When the blades are lowered and the mixture in the container is agitated, the casing 34 prevents the batch from being splashed out of the container on to the housing or other parts of the apparatus. The openings 35 are provided to allow gases arising from the mixture to escape when the cover is on the container or when the blades are in the raised position. The gases which arise from the mixture pass from the housing through suitable pipe connections 36 which may have a suction fan or other suitable means attached to the pipe connections at 37.

Acid and ground phosphate rock are introduced into the container by means of an acid pipe 38 and a chute 39 which are mounted upon the housing cover 15 near the agitating mechanism. The pipe connects with a source of acid supply and the chute is adapted to carry a supply of ground phosphate rock. Both the pipe and the chute empty into a container.

Referring to Figure 4, I have shown the arrangement of the containers and the method of mounting them upon the revoluble frame. In the present arrangement I have shown six containers, but the number may be increased to give any desired capacity for the apparatus.

The elements of the revoluble frame 1 are connected by means of cross pieces 1' which serve to strengthen and brace the frame structure. A compartment is formed at C within the housing by radial closure means 40. The compartment C is open at the bottom to permit the mixture within the containers to be discharged. The container as shown in the compartment is in inverted position. It is brought into this position by the trip means 41 which is attached to the housing and coacts with the extension rods 11'. Additional means to assist in discharging the batch from the containers is provided by a stirring means 9' which is adapted to revolve and loosen the batch from the bottom of the container in order that it may be more easily discharged. The action of the tripping device will be hereinafter described. The discharged material is removed to a suitable drying room by the conveyor means 42.

Referring to Fig. 5, I have shown the positions of a container as it enters the compartment C and is discharged. The mold M formed of phosphate rock and acid is dropped from the container upon the conveyor 42 and transported to a drying room. The closure 40 is made flexible by means of the sections 43 hinged as at 44. By this means the containers are all closed, except the one being discharged, in order to prevent gases from escaping to the atmosphere during the time the containers travel after the mixing operation. The hinged portions of the closure means 40 move in an arc, as indicated by the dotted lines, when a container passes into the compartment C and is discharged.

The operation of my device is as follows: Assuming that a charge of ground phosphate rock and acid has been introduced into a container in the position A shown in Fig. 2. The material is passed through the acid pipe and the phosphate rock chute and the agitating mechanism is operating. At this time the revoluble frame is stationary. After the charge is thoroughly mixed, the agitators are lifted by means of the fulcrum, the revoluble frame begins to rotate, and the container in position A passes from under the agitating device. After the revoluble frame passes through a certain length of travel, another container is carried into position under the agitating mechanism, the blades are lowered, and the charge which has been introduced into the container is thoroughly mixed. When the container in the position A reaches the position A', then on the next mixing operation, the container is carried into the compartment C and its contents discharged in the form of a mold upon the conveyor. The molds are transported to a suitable drying room and prepared for commercial use.

It will be understood that any suitable means may be employed to connect the movable elements of the apparatus and cause them to act in synchronism. When the agitating blades are removed from a container, power is supplied to the frame upon which the containers are mounted, and causes it to revolve. When the blades are lowered into a container, the rotation of the frame is arrested. A central source of power may be used to supply the apparatus.

Referring to Fig. 3ª, I have shown a diagrammatic view of one form for connecting the agitating means and the revoluble frame, the agitating means and the source of power. This arrangement is adapted to connect the source of power with the frame and the agitators alternately after particular intervals during the operation of the device.

Referring to Fig. 6, I have shown the position of the agitating mechanism when the groups of blades are lowered into a container.

In Fig. 7 I have shown the blades lowered into a container. The casing which is provided to prevent splashing of the material during the mixing operation is shown in position on top of a container.

Referring to Figs. 8 to 13 inclusive, I have shown a container passing through several stages of the tripping operation. The operation of the tripping device is as follows: A container having a mixture of ground phosphate rock and acid is carried along on the revoluble frame until one of the rod extensions 11', attached at the base of the container comes into contact with the trip cam 41 which is mounted upon the stationary housing. The rod extension 11' engages with the cam member and arrests the forward movement of the container which causes the container to be carried upwards in the curved slot 10 by means of the rod supports 11 to which the container is attached. When the rod supports 11 reach the end of their travel in the slots 10, the container is turned over and the mold M is discharged upon the conveyor 42. After the container is discharged, it is returned to its upright position by means of the action of the cam upon one of the rods 11', and it is then in position to receive another charge of acid and phosphate rock.

Referring to Fig. 14, I have shown a diagrammatic view of the different steps in my process. The sulphuric acid and phosphate rock dust are introduced into the container, the blades are lowered and the batch thoroughly mixed, then the blades are raised and the container passes from under the agitator and is carried with the revoluble frame until it encounters the tripping device. The container is discharged and the mold transported to a suitable drying room 44, in which the mixture is air treated. Connected with the drying room is a source of raw phosphate dust 45 which may be applied to the mixture before or after the mixture has been treated in the drying room.

A suitable chute 46 provided with a valve 47 connects the drying room with a mixing unit 48. A hopper 49 containing raw phosphate dust connects with the mixing unit and a suitable valve 50 is provided in a pipe connection 51 between the hopper and the mixing unit. The purpose of the hopper is to supply additional phosphate dust during the mixing operation before the acid is packed and ready for shipment.

Referring to Fig. 15, I have shown one of the shafts 21 upon which the agitators 20 are mounted. The shafts are provided with splines 52 adapted to slide through the support member 26 and the gear 22. This arrangement is provided to allow the movement of the blades within the housing.

Referring to Fig. 16, I have shown one of the gears 22 having slots 53 cut therein which are adapted to receive the splines 52 on the shafts 21.

Many of the apparatuses used for manufacturing acid phosphate are equipped with some sort of knives or other devices used to chip the material before preparing it for commercial use. All break down the porosity. In my apparatus the chipping device has been entirely eliminated and the porosity maintained. The mixture formed in the containers is discharged in the form of a mold and carried to a suitable drying room where it is air treated. It is not necessary to take the acid phosphate to a pile in storage to complete the chemical action and drying. It is to be understood that the material is not necessarily in mold form, the essential feature being that the porosity must be maintained. The material may be broken down but with the least possible disturbance of the porosity. It is this maintaining of the porosity during the process of curing that gives my process its peculiar utility.

With modern machines for grinding the phosphate rock to a very fine state, the action is completed almost immediately, except those actions of crystallization which are accomplished by drying in air, which may be hot or cold, or steam drying may be used. Any small amount of phosphate lime not converted into soluble form immediately is not of sufficient commercial value to warrant the expense of storing.

In most of the processes, the sponge formed after mixing the dust and acid has to be broken up to release the gases and steam from the charge. This is particularly true where one charge is dumped on top of another charge. The effect of this is to seal the pores of reaction. This may also occur when a single charge is dumped from one container to another container after the semi-liquid mass has partly solidified. In my process the mass during solidification of one charge remains untouched after once being mixed.

All acid phosphate when made has a certain percentage of free phosphoric acid which must be eliminated before the product is perfect for agricultural use. Manufacturers usually eliminate this by the addition of raw formed phosphate rock or lime after the product is out of the den. The difficulty is to add this uniformly to a product which masses and gums up with handling. My method is to eliminate sufficient excess moisture, and to sufficiently complete the crystallization of the product so as to prevent gumming while dusting, as the process is commercially known, and while the product is still hot, which helps the reaction. It is to be understood that if the product becomes cool, heat can be added while dusting.

While I have shown and described the preferred embodiment of my invention, I wish it to be understood that I do not confine myself to the precise details of construction set forth by way of illustration, as it is apparent that many changes and variations may be made therein, by those skilled in the art, without departing from the spirit of the invention, or exceeding the scope of the appended claims.

I claim:

1. A process for manufacturing acid phosphate by mixing ground phosphate rock and an acid in individual containers, eliminating excess moisture, and air treating the product.

2. A process for manufacturing acid phosphate by thoroughly mixing ground phosphate rock and an acid in relatively small containers, eliminating excess moisture, neutralizing free phosphoric acid, and air treating the product.

3. A process for manufacturing acid phosphate by thoroughly mixing ground phosphate rock and an acid in containers, eliminating excess moisture, adding raw phosphate rock while the mixture is still hot, and air treating the product.

4. A process for manufacturing acid phosphate by thoroughly mixing phosphate rock and an acid in containers, passing the containers through a given travel to form a mold, adding phosphate rock to the mold, and air treating the product.

5. A process for manufacturing acid phosphate by thoroughly mixing ground phosphate rock and an acid in containers, passing the containers through a given travel to form a mold, adding raw phosphate rock uniformly to the mold while it is still hot, and air treating the product.

6. A process for manufacturing acid phosphate by thoroughly mixing ground phosphate rock and sulphuric acid in containers, passing the containers through a given travel to form a mold, discharging the containers and passing the mold through an additional travel, adding raw phosphate rock uniformly to the mold, and air treating the product.

7. A process for manufacturing acid phosphate by mixing phosphate rock and an acid to form a porous mass, and drying the mass without substantially disturbing the porosity.

8. A process for manufacturing acid phosphate by mixing ground phosphate rock and an acid in separate containers to form individual porous masses, and eliminating the excess moisture without substantially disturbing the porosity.

9. A process for manufacturing acid phosphate by thoroughly mixing ground phosphate rock and an acid to form a porous mass, eliminating excess moisture, neutralizing free phosphoric acid, and drying the mass without substantially disturbing its porosity.

10. A process for manufacturing acid phosphate by thoroughly mixing ground phosphate rock and an acid to form a porous mass, eliminating excess moisture, adding raw phosphate rock to the mixture and drying the mass without substantially disturbing its porosity.

11. A process for manufacturing acid phosphate by thoroughly mixing ground phosphate rock and sulphuric acid in separate containers to form a porous mass, passing the containers and the mass through a given travel, discharging the containers, and adding raw phosphate rock uniformly to the mass without substantially disturbing the porosity of the mass.

12. A process for manufacturing acid phosphate characterized by mixing phosphate rock and acid and accelerating the consequent chemical reaction by maintaining a high degree of porosity in the mixture.

13. A process for manufacturing acid phosphate comprising mixing phosphate rock and acid, allowing the mix to assume a porous structure, and aerating this product without substantially altering its physical constitution.

14. A process for manufacturing acid phosphate comprising mixing phosphate rock and acid, allowing the mix to assume a porous structure, and aerating this mix without disintegration.

15. The process for manufacturing acid phosphate characterized by mixing phosphate rock and acid in relatively small batches, permitting the mix to assume a porous structure whereby crystallization of the products in accelerated.

16. A process for manufacturing acid phosphate comprising mixing phosphatic rock and an acid in relatively small batches, allowing the mixture to stand for a time sufficient to permit an initial exothermic reaction whereby a spongy mass is produced, and passing the mixture through a length of travel at a rate of speed sufficient to allow partial dissipation of the heat of reaction.

17. A process for manufacturing phosphate fertilizer comprising mixing phosphatic rock and an acid in relatively small batches to form a porous mass of relatively large surface area, and subsequently processing the mass without disturbing the porosity.

18. A process for manufacturing acid phosphate comprising mixing phosphate material and an acid in relatively small batches to form a porous mass and drying the mass without substantially disturbing its porosity.

19. A process for manufacturing phosphate fertilizer characterized by mixing phosphate rock and an acid, allowing the mix to stand for a time sufficient to permit it to attain a porous structure and maintaining the porosity throughout subsequent treatment.

20. A process for manufacturing phosphate fertilizer comprising mixing phosphatic rock and an acid, allowing the mixture to stand for a time sufficient to permit the mixture to assume a porous structure and aerating and dusting the mass without materially disturbing its porosity.

In testimony whereof I affix my signature.

BEVERLY OBER.